May 20, 1952

C. V. CARLSON 2,597,704

PROCESS OF MAKING HOLLOW BODIES
FROM FUSIBLE PLASTIC MATERIALS
Filed Aug. 22, 1949

INVENTOR
CLINTON V. CARLSON

BY
Williamson & Williamson
ATTORNEYS

Patented May 20, 1952

2,597,704

UNITED STATES PATENT OFFICE 2,597,704

PROCESS OF MAKING HOLLOW BODIES FROM FUSIBLE PLASTIC MATERIALS

Clinton V. Carlson, Minneapolis, Minn., assignor to Cosom Industries, Inc., Minneapolis, Minn., a corporation of Minnesota Application August 22, 1949, Serial No. 111,624

6 Claims. (Cl. 154—116)

This invention relates to the manufacture of thin, hollow bodies from thermoplastic materials and to a new article of manufacture, capable of wide use.

It is an object of my invention to provide a comparatively simple, economical and commercially successful process of making thin, elastic and somewhat flexible hollow bodies from thermoplastic materials adapted to be used for balls, containers, housings, capsules and the like.

A further object is the provision of a new and commercially successful and economical process of manufacturing thin, hollow and durable plastic bodies of generally closed shape which eliminates the need for "blowing apparatus" or mold cores or inflations.

More specifically, it is an object to provide a simple, economical and high capacity process of manufacturing bodies of the class described by first molding a pair of shell sections from thermoplastic molding powders with complementary shaped registering edges and then uniformly and simultaneously heating the said edges and rapidly withdrawing the heating source and forcing the same together with the edges perfectly registering to thereafter form a substantially perfect weld which integrates the two sections into a unitary, substantially closed body.

A further and very important object is the provision as an article of manufacture of a novel, hollow body of thin shell construction having elasticity and degree of flexibility and adapted to withstand hard impacts, flexing or compression without injury.

Another object is the provision of an article of manufacture of a thin, hollow, thermoplastic body in the form of a practice golf ball which may be only driven a short range and which will indicate quite accurately whether the player is driving or otherwise stroking the ball properly or whether he is hooking, slicing or topping the ball.

These and other objects and advantages of my invention will be more apparent from the following description made in connection with the accompanying drawings, wherein like reference characters refer to similar parts throughout the several views and in which.

In Figs. 1 to 6 of the drawings, I illustrate the essential parts of the subsequently integrated, hollow body in the successive stages of manufacture under my new process as well as the completed practice golf ball constituting a new, functional device and a new article of manufacture.

In carrying out the process of my invention, a pair or multiplicity of pairs of thermoplastic shells are molded from thermoplastic molding powders such as polyethylene, nylon, vinyl and other well known molding powders or granules. For practice golf balls and semi-flexible commercial containers, polyethylene molding powder is preferred as it affords greater toughness and elasticity than the other thermoplastic materials I have used.

Figure 7:
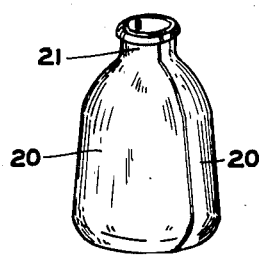
Fig. 7 is a perspective view with some portions broken away, illustrating another article of manufacture in the form of a bulb type of container made at low cost in accordance with my improved process.

In making a spherical, thin, hollow body or a symmetrical body such as is illustrated in Fig. 7, the two cooperating shell members may be identically molded but in some types of thin, closed bodies the two shell members may to a considerable extent be of different dimensions provided they have complemental registering edges of similar dimensions.

Figure 1:
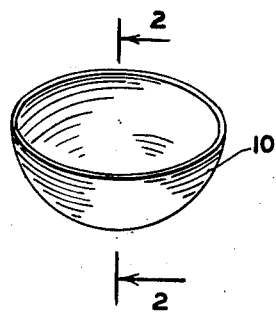
Fig. 1 is a perspective view illustrating semi-spherical shell section molded from thermoplastic material such as polyethylene molding powder which exemplifies the carrying out of the first steps of my process.
Figure 2:
Fig. 2 is a cross section taken on the line 2—2 of Fig. 1.
Figure 3:
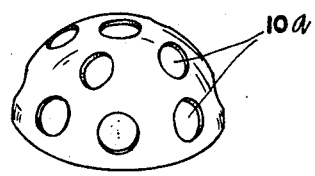
Fig. 3 is a perspective view of the same semi-spherical shell inverted from the position shown in Fig. 1 after it has been perforated to provide several circumferential series of perforations radially disposed of the spherical sector.

In Figs. 1 and 2, semi-spherical thin shells 10 are molded in conventional manner from the thermoplastic molding powder such as polyethylene and the same are curved, removed from the mold or molds and then in the course of manufacture of the practice golf ball, are applied to a suitable set of piercing or perforating dies (not shown) to simultaneously form the multiplicity of precisely arranged radial apertures 10a in each shell section. A set of dies for simultaneously forming apertures 10a are preferably constructed with the piercing elements all slidably disposed in the male die housing or shoe in various positions radial to the center of the spherical surface. Means which may be mechanical or hydraulic are provided for simultaneously projecting all of the piercing die members inwardly toward the center of the semi-sperical shell 10 and the female elements of the other die member.

As shown, the multiplicity of perforations 10a in each shell 10 are arranged as symmetrically as possible, constituting as shown, a lower circumferentially spaced series adjacent the edge of the shell and a second circumferentially spaced series of fewer apertures disposed above the first series and staggered in respect thereto. As shown, a single end aperture is formed, disposed axially of the spherical shells in the positions shown in Figs. 3 and 4.

Figure 4:
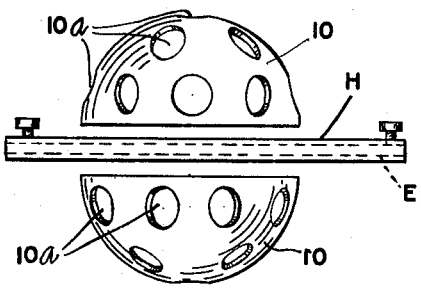
Fig. 4 is a side elevation showing a pair of semi-spherical shell sections constructed in accordance with an embodiment of my invention and opposed in spaced, axially aligned relation for simultaneous application of the complementary shaped edges thereof with a controlled heating unit for partially fusing the edges to facilitate subsequent welding thereof.

In the next step of my process, complemental pairs of the shells 10 having edges for registration are selected and fed by automatic machinery if desired into positions where the edges of the two sections 10 are spaced apart and axially aligned as shown in Fig. 4. Simultaneously therewith or immediately thereafter, a controlled heater element H is interposed between the two shell sections such as a smooth faced, heat-conductive plate having embedded therein or otherwise associated therewith, a heating element which may be of the electric type.

The heater element H is thermostatically controlled to be maintained at the optimum temperature for partially fusing and softening the edges of the shell sections 10. This temperature of course varies in accordance with the particular thermoplastic materials used and also in the thickness of the edges to be welded. In my process, the two aligned shell sections 10 are brought into contact with the smooth faces of heater element H preferably through automatic machinery and stay in such contact for an extremely short duration, ordinarily less than two or three seconds and are thereafter withdrawn axially from the plate and the plate thereafter removed from its interposed position.

In carrying out my method, I have found that metal conductive plates coated from time to time with a chemical product made by E. I. Dupont de Nemours & Co., will permit contact and fusing of said edges and subsequent withdrawal of the edges of the heating plate without adhering the semi-fused edges with the plate.

Figure 5:
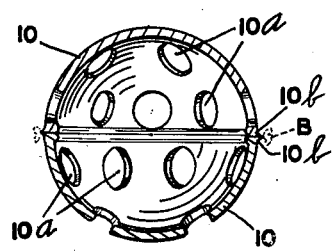
Fig. 5 is a vertical section taken diametrically through the spherical hollow member formed by the shell sections after welding of the two complemental and registering edges of the shell sections, illustrating not only the integrating step of my method but a minor molding step important in the formation of an ornate and well finished seam.

In the next step of my process which should be carried out immediately upon withdrawal of the heater plate from its interposed position between the edges of the shells, the shells still in axial alignment, are brought together with the complemental edges thereof registering and inward pressure is applied to the ends of the two shells to cause the slightly fused edges to weld together, bonding the shells into an integral closed body as shown in Fig. 5. In this welding step, forms or chucks not shown, are employed surrounding the external contours of the two shell sections and of the precise shape of the finished article with marginal portions adjacent the edges thereof for squeezing the somewhat molten material at the edges of the shell to mold and form the external marginal portions at the edges into ornate seam sections 10b. In doing this, a small amount of material is scored and squeezed into a readily removable band or ribbon B indicated in dotted lines in Fig. 5. The edges, due to the pressure exerted against the ends of the shells and the fact that the same are in partially fused state, thicken slightly, leaving a somewhat wider welding surface than the thickness of the original shell sections 10. The widening of the welded edges does not in any way deform the spherical shape due to the chucks having mold effect which are used during the welding step. Thus, a very efficient reinforcing weld is provided, extending the full circumference of the closed body or sphere formed. The integrated, thin, hollow body is then permitted to cool and thereafter removed and the circumferential band or ribbon B is readily separated and removed from the external seam.

In Fig. 7, a symmetrical, thin, flexible container for use in containing and dispensing various liquids and semi-solids, is illustrated comprising a pair of integrated shell sections 20 constructed and welded together in accordance with my process. Such a container has wide use in the commercial field when constructed from thermoplastic material of elastic and flexible nature. The body may be flexed to apply pressure as a bulb, to the contents and upon release of pressure, will immediately return to its normal, distended position. The container as shown, has a neck 21 which is adapted to receive a plug or stopper with if desired, a discharge opening or nozzle therein.

Figure 6:
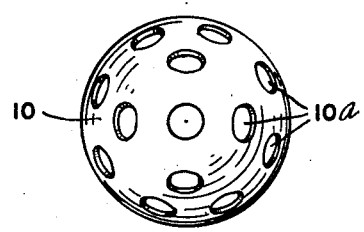
Fig. 6 is a perspective top view of the finished practice golf ball made in accordance with the process of my invention and constituting an improved and new article of manufacture.

The article of manufacture illustrated in Fig. 6 constitutes a novel and highly efficient practice golf ball. The relatively low specific gravity of the thermoplastic material, preferably polyethylene and the multiplicity of radial apertures in the spheroid provide a light elastic ball having the general appearance of a golf ball which may be driven with various golf clubs with full stroke and force but which due to air resistance and passage of air therethrough in flight, very materially restricts the distance of travel. With the construction illustrated utilizing a spheroid of the approximate diameter of a golf ball and having the apertures disposed as shown and of the diameter indicated, the ball will only travel from 20 to 25 yards when subjected to a powerful drive from a driving golf club. Nevertheless, the player may readily ascertain mistakes in his strokes and in fact, because of air resistance of the perforated ball, "slicing," "hooking" or "topping" are accentuated.

When the practice ball is struck, the material compresses readily upon impact, overcoming any inaccuracies which would be present because of the perforated structure if the material were not readily compressible. In extension, actual use the article has demonstrated a high accuracy for indexing mistakes in the stroke and impact of the player.

From the foregoing description it will be seen that I have provided a simple and efficient process for manufacturing a new practice golf ball as well as other articles of manufacture, including various symmetrical and non-symmetrical thin, hollow bodies utilized for casings, containers, balls, Christmas tree ornaments and the like.

It will further be seen that I have provided a practice golf ball enabling a player to practice golf driving in a small area and to detect fallacies in his strokes, stance and impact of club with ball.

It will of course be understood that various changes may be made in the form, details, arrangement and proportions of the parts without departing from the scope of my invention.

The terms annular and generally annular as appearing in the claims of the application are used in the broad sense to indicate closed or nearly closed planar geometric figures formed generally like a ring and including the figure of the edges of the shells 20 forming the container shown in Fig. 7 as well as equivalents thereof.

What I claim is:

1. The process of making a thin, hollow body from thermoplastic molding powder which consists in molding and curing a pair of thin shell members having complementary shaped registering generally annular edges, simultaneously heating the edges of said pair of shell members to a point to soften and partially fuse said edges, then immediately bringing said edges together with pressure against said shells at lines normal to the general planes of said edges to thereby cause said partially fused edges without application of any bonding material, to weld together and cure, forming a strong, integral structure.

2. The process of making a thin, resilient and somewhat flexible, hollow body from thermoplastic molding powder which consists in first molding and curing a pair of thin shell members having complementary shaped registering generally annular edges, heating said edges to a point to soften and partially fuse the same through direct contact of said edges with controlled heating surfaces, then immediately positioning said shell members with said edges aligned and applying inward pressure against said shells at lines normal to the general planes of said edges to thereby cause said partially fused edges without application of bonding material to weld together, curing and forming a strong, integral structure.

3. The process set forth in claim 2 further characterized by the retaining of said shell members in rigid mediums conforming to the external shape thereof during all of said recited steps.

4. The process of making a thin, light, hollow body suitable for use as a practice golf ball which consists in molding and curing from thermoplastic molding powder a pair of thin, semispherical shell members having complementary shaped registering annular edges, forming a multiplicity of substantially uniformly distributed apertures in each of said shell members by simultaneously piercing said shell members at a multiplicity of points radially of the center of the spherical surface, then heating the edges of said shell members to a point to soften and partially fuse the same and then immediately bringing said edges together with application of pressure against said shells at lines normal to the general planes of said edges and thereby fusing and integrating said shells.

5. In the process of making a thin, hollow body from fusible, plastic materials, the steps of welding together a pair of shell members constructed from said plastic material and having complementary shaped registering edges which substantially define a generally annular figure consisting in first holding a pair of said shell members in spaced relation with said registering edges substantially aligned and with the axes of said shells substantially coincident, interposing a heating plate between said edges of the pair of shell members with surfaces of said plate disposed parallel to said edges, moving said shells together to position said edges in substantially uniform contact throughout their closed configuration with surfaces of said heating plate to soften and partially fuse said edges, withdrawing said heating plate from said edges without disturbing the softened edges, then immediately moving said shell members together with said softened edges thereof in registration and applying inward pressure against said shells at lines normal to the general planes of said edges to weld said shells together to form a strong, integrated structure.

6. In the process of making thin, hollow articles from fusible plastic materials, the steps of integrating pairs of shell members constructed from said plastic materials and having complementary shaped, registering edges which substantially define an annular figure consisting in, first nesting and holding a pair of such shell members in a spaced relation with said registering edges substantially aligned and disposed in generally parallel planes, interposing a heating plate between the spaced edges of said shell members with surfaces of said plate being disposed parallel to said edges, simultaneously moving said shells together and against said parallel surfaces of said heating plate to position said edges in substantially uniform contact throughout their closed configuration against surfaces of said heating plate whereby softening and partial fusion of said edges is effected, thereafter simultaneously withdrawing said shell members from contact with said heating plate in directions normal to the planes defined by said contact areas, withdrawing said heating plate from between said shell members and thereafter, immediately moving said shell members together at lines normal to the general planes of said edges and applying inward pressure upon registration of said shell edges to uniformly weld said shells into an integrated body.

CLINTON V. CARLSON.

REFERENCES CITED

The following references are of record in the file of this patent:

UNITED STATES PATENTS

| Number | Name | Date |
| --- | --- | --- |
| 712,413 | Richards | Oct. 28, 1902 |
| 1,483,165 | Eaton | Feb. 12, 1924 |
| 1,531,505 | Roberts | Mar. 31, 1925 |
| 1,684,557 | Saunders | Sept. 18, 1928 |
| 2,091,684 | Mabee | Aug. 31, 1937 |
| 2,289,872 | Brinkmann | July 14, 1942 |
| 2,319,683 | Hofmann | May 18, 1943 |
| 2,378,034 | Perryman | June 12, 1945 |
| 2,379,500 | Steffans | July 3, 1945 |
| 2,448,173 | Cowan | Aug. 31, 1948 |